United States Patent [19]
Rippetoe et al.

[11] Patent Number: 6,106,787
[45] Date of Patent: *Aug. 22, 2000

[54] METHOD OF AND APPARATUS FOR TREATING FLUIDS TO ALTER THEIR PHYSICAL CHARACTERISTICS

[75] Inventors: William W. Rippetoe, Bixby; David N. Shroff, Broken Arrow, both of Okla.

[73] Assignee: Universal Environmental Technologies, Inc.

[*] Notice: This patent is subject to a terminal disclaimer.

[21] Appl. No.: 08/900,201

[22] Filed: Jul. 25, 1997

[51] Int. Cl.$^7$ .............................. B01J 19/08; B01J 16/00
[52] U.S. Cl. ............................... 422/186.04; 210/198.1; 205/745; 422/186
[58] Field of Search ............................. 422/186.04, 186, 422/186.01; 210/696, 192, 198.1; 205/745; 204/197

[56] References Cited

U.S. PATENT DOCUMENTS

| | | | |
|---|---|---|---|
| 4,820,422 | 4/1989 | Spencer | 210/696 |
| 5,048,499 | 9/1991 | Daywalt | 123/538 |
| 5,197,446 | 3/1993 | Daywalt et al. | 123/538 |
| 5,482,629 | 1/1996 | Rippetoe et al. | 210/448 |
| 5,485,883 | 1/1996 | Rippetoe et al. | 166/369 |
| 5,554,301 | 9/1996 | Rippetoe et al. | 210/748 |

*Primary Examiner*—Marian C. Knode
*Assistant Examiner*—Susan Ohorodnik
*Attorney, Agent, or Firm*—Brinks Hofer Gilson & Lione

[57] ABSTRACT

Method and apparatus for altering the physical characteristics of liquids and gases. The fluid is pumped into an elongated cylindrical chamber whose elongated wall contains a multiplicity of spaced apart cylindrical holes under sufficient pressure to cause the fluid to exit from the cylindrical holes as jets having an exit velocity of at least 0.025 feet (0.0076 m) per second. The jets of fluid exit from the cylindrical holes into an annular chamber surrounding the elongated cylindrical chamber and having a common axis as the elongated cylindrical chamber. The entire inner surface of the annular chamber is coated with an alloy of copper and nickel. The jets of fluid bombard the surfaces of the annular chamber to induce the copper-nickel alloy to give up electrons. The freed electrons combine with a significant number of molecules of the fluid to thereby alter the physical characteristics of the entire body of fluid.

10 Claims, 1 Drawing Sheet

U.S. Patent
Aug. 22, 2000
6,106,787
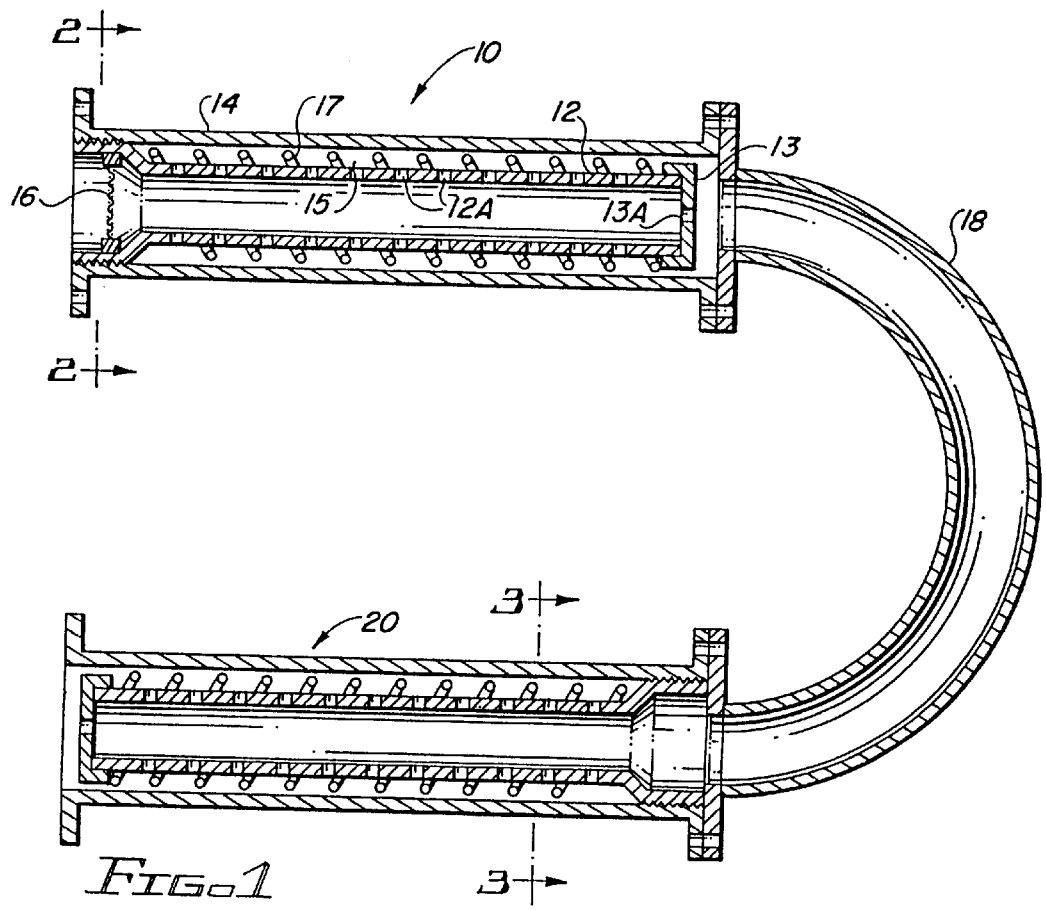
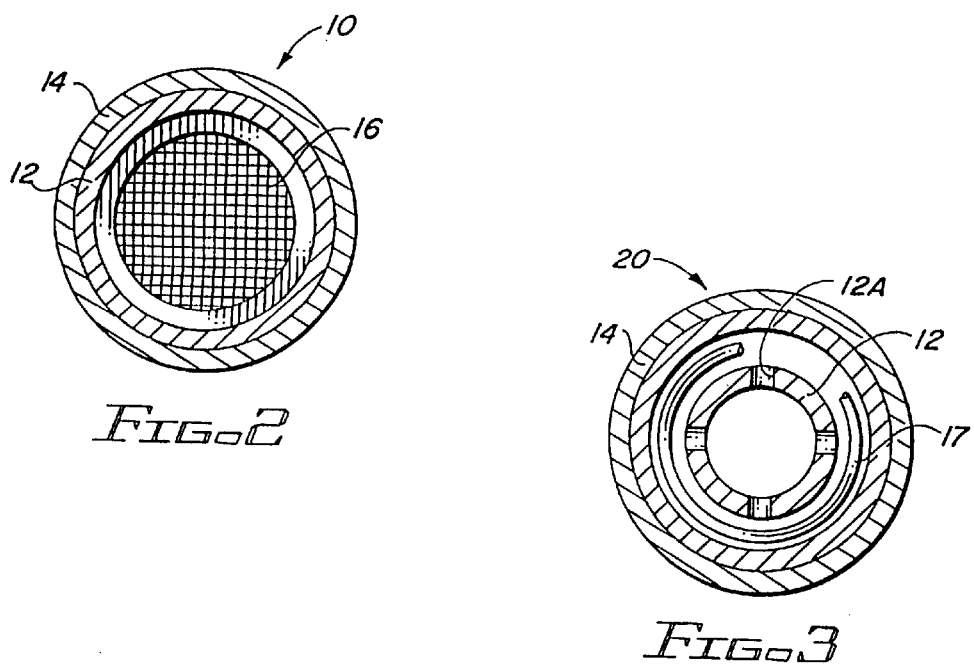
Fig. 1
Fig. 2
Fig. 3

METHOD OF AND APPARATUS FOR TREATING FLUIDS TO ALTER THEIR PHYSICAL CHARACTERISTICS

TECHNICAL FIELD

The present invention pertains to a method of and apparatus for altering certain physical characteristics of liquids and gases by electrically charging the molecules of at least a portion of the treated liquid or gas.

BACKGROUND ART

We are the inventors of a device which we have named the Ion Collider™ on which we filed patent application Ser. No. 08/350,849 in the U.S. Patent and Trademark Office on Dec. 7, 1994 now U.S. Pat. No. 5,482,629. The Ion Collider was developed and has been successfully used to improve the process of separating particles entrained in a liquid from the liquid.

For example, when water containing oil particles is allowed to settle in a tank and then the layer of oil decanted off, the decanted oil contains about 15 percent water and the remaining water contains about 50 parts oil per one million parts water. However, when the water containing oil particles was treated in our Ion Collider prior to entering the settling tank, the decanted oil contained less than one percent water and the remaining water contained about 10 parts oil per billion parts water.

Based upon tests recently conducted, we have found a new use for our Ion Collider. When certain liquids and gases are treated in our Ion Collider, the treated liquid or gas exhibits economically beneficial changes in its physical characteristics.

As an example of a change in the physical characteristics of a liquid treated in our Ion Collider, water run through the Ion Collider requires 15 percent less energy to convert a given volume of treated water to steam than it does to convert the same volume of untreated water to steam. Moreover, the hardness of the treated water will be measurably reduced.

While we are not nuclear physicists, we believe the changes we have observed in a number of Ion Collider-treated liquids and gases results from ionization, i.e., electrical charging, of a significant number of the molecules of the treated liquid or gas.

DISCLOSURE OF THE INVENTION

In brief, the invention comprises use of our Ion Collider to treat fluids to alter, in an economically beneficial way, physical characteristics of the treated liquids and gases. In its simplest form, the Ion Collider comprises two spaced apart concentrically arranged metal cylinders or pipes. Both pipes may be made of a copper-nickel alloy or, preferably, the outer pipe is made of a ferrous metal and the inner surface of the outer pipe is flame coated with a copper-nickel alloy.

The entire wall of the inner pipe contains a multiplicity of spaced apart radially bored, preferably identical, holes; and, the exit end of the inner pipe is capped. The opposite or entry end of the inner pipe is joined to the corresponding end of the axially aligned outer pipe so that the only entry into the Ion Collider is through the entry end of the inner pipe and the only exit from the Ion Collider is the opposite or exit end of the outer pipe. We call the elongated annular chamber between the inner and outer pipes bounded by copper-nickel surfaces, the electron exchange chamber. The entry end of the inner pipe may have a filter screen to prevent entry of gravel or other undesirable particles into the Ion Collider.

In operation, liquid or gas under pressure is pumped into the inner pipe causing a multiplicity of streams or jets of the fluid to issue from the radially bored holes in the wall of the inner pipe and bombard the copper-nickel walls of the chamber between the two pipes. Electrons freed from the copper in the walls of the electron exchange chamber combine with molecules of the liquid or gas, thereby altering certain physical characteristics of the entire body of fluid.

BRIEF DESCRIPTION OF THE DRAWINGS

The appended drawings illustrate a preferred form on the Ion Collider and are intended to supplement the description of the invention in the text of this application.

FIG. 1 is a cross-sectional plan view taken through the center of two co-acting Ion Colliders;

FIG. 2 is a cross-sectional elevational view taken along line 2—2 of FIG. 1;

FIG. 3 is a cross-sectional elevational view taken along line 3—3 of FIG. 1.

BEST MODE FOR CARRYING OUT THE INVENTION

Referring to FIGS. 1 and 3, Ion Colliders 10 and 20 each include two spaced apart concentric elongated cylindrical metal pipes. Each pipe may be made of copper-nickel alloy or, preferably, the outer pipe 14 is made of a ferrous metal with the inner surface of the outer pipe flame coated with an alloy preferably containing 90 percent copper and 10 percent nickel.

The wall of inner pipe 12 contains a multiplicity of spaced apart radially bored holes 12A and its exit end is closed by a cap 13 which may or may not include a single hole 13A in the center of the cap. The entry end of pipe 12 is joined to outer pipe 14 as shown in FIG. 1 and a filter screen 16 of copper mesh shown in FIGS. 1 and 2 is fitted over the entry end of pipe 12 to prevent intrusion of unwanted solid particles into Ion Colliders 10 and 20.

When the diameter of outer pipe 14 is four inches (10.16 cm) or greater, the inner surface of outer pipe 14 is preferably spaced about one and one-half inches (4.31 cm) from the outer surface of inner pipe 12. Both pipes 12 and 14 may be made of copper-nickel alloy in which the nickel comprises at least one percent and copper comprises at least 80 percent of the composition of the pipes. Preferably, pipe 14 is made of black iron and the inner surface of pipe 14 is flame coated with a copper-nickel alloy containing about 10 percent nickel and 90 percent copper.

We have found that for best results the sum of the cross-sectional areas of the multiplicity of holes 12A should equal or, preferably, be 1.2 times the cross-sectional area of inner pipe 12 in order to prevent any back pressure or flow restriction during operation of the Ion Collider. Moreover, the jet velocity, that is, the velocity of the liquid or gas jets as they exit from holes 12A, should be at least 0.025 feet (0.0076 m) per second. The formula for computing the jet velocity in feet (m) per second of the liquid or gas existing from holes 12A is 4,085 times the gallons (3.785 liters) per minute divided by the square of the diameter of holes 12A.

Ion Colliders have been successfully operated in various sizes. When the diameter of outer pipe 14 ranges from four to 14 inches (10.16 cm to 35.56 cm), the distance between the outer surface of the inner pipe and the inner surface of the outer pipe should be about one and one-half inches (4.31 cm), thereby creating an elongated annular chamber whose surfaces consist of copper-nickel alloy such as electron exchange chamber 15 between pipes 12 and 14 as shown in FIG. 1.

We have achieved excellent results using an inner pipe 12 made of copper-nickel alloy and an outer pipe 14 made of black iron and flame coating the inner surface of pipe 14 with a copper-nickel alloy. Flame coated pipe has a roughened irregular surface, thus presenting more surface area of copper to the turbulent action of the jetted liquid or gas in chamber 15 and causing the creation of more electrons freed from the copper or copper-nickel surface.

To increase turbulence and provide more contact surface area in chamber 15, a helix of copper or copper-nickel wire 17 is loosely wrapped around the length of the outer surface of inner pipe 12.

Although significant results have been achieved using only one Ion Collider 10 as shown in FIG. 1, increased results are often obtained by using a pair of co-acting Ion Colliders such as 10 and 20 shown in FIG. 1. In such cases, the liquid or gas treated in Ion Collider 10 is passed through a deceleration tube 18 whose function is to create an abrupt decrease in the momentum of the fluid exiting from chamber 15. The cross-sectional area of tube 18 is preferably equal to the cross-sectional area of outer pipe 14.

We have used various sizes of our Ion Collider to treat a wide variety of liquids and gases to produce economically beneficial changes in the physical characteristics of the liquids and gase. Fluids treated include hydrocarbon fuels, numerous oils, crude oil storage tank "bottoms," water, blood, plasma, and gases such as freon used as refrigerants.

When gasoline, diesel fuel, propane and other hydrocarbon fuels are treated in our Ion Collider, the treatment disassociates the fuel, reduces its molecular weight, and increases its vapor pressure. This results in more complete combustion, better engine efficiency, reduced emissions and up to a 10 percent increase in engine torque and horsepower.

Treatment of crude oils, lubricating oils and hydraulic oils in the Ion Collider breaks up the long chain hydrocarbon molecules in the oil, making the oil "slicker" and less capable of transporting suspended solids. Treatment of crude oils in the Ion Collider increases their American Petroleum Institute specific gravity by at least two to three points and also breaks up the long chain hydrocarbon and paraffin molecules in the crude oil, thereby increasing the marketability of the treated crude oil.

In a recent demonstration, when crude oil field storage tank "bottoms" which were too dense to have an American Petroleum Institute specific gravity measurement were run through an Ion Collider, the resulting product had an American Petroleum Institute specific gravity of 35°, thereby converting the solid bottoms into a refineable liquid. The Ion Collider used in this demonstration had an outer black iron pipe 2.35 inches (5.96 cm) in diameter whose inner diameter had been flame coated with copper-nickel alloy and a copper-nickel alloy inner pipe or cylinder 0.75 inches (1.91 cm) in diameter, with a 0.125-inch (0.318 cm) diameter copper wire helix 17 loosely wound around the length of electron exchange chamber 15.

Ion Collider treatment of used hydraulic oils eliminates pump varnish, precipitates suspended particles and turns brown, used hydraulic oil back to its original pink color. Treatment of virgin or new hydraulic oils eliminates its tendency to accumulate pump varnish and other suspended particles.

Treated lubricating oils exhibit greater lubricity and reduce friction between the lubricated components.

Water used in boilers which is first treated in an Ion Collider reduces its boiling point and, thus, the energy required to convert the water into steam. Treatment also "softens" the water, reducing or eliminating the need for water-softening chemicals, and inhibits the formation of scale and removes existing scale. In addition, treatment of the water prevents corrosion in the boiler tubes by inducing an anode to act more like a cathode.

Ion Collider treatment followed by filtration softens drinking water, enhancing the taste, odor and color of the drinking water.

Treated water used in irrigation penetrates the soil, creating an ion exchange in the soil resulting in a breakdown of salts in the soil which prevents tip burn and salt poisoning in plants and trees while at the same time enhancing the plants' ability to absorb nutrients from the soil and fertilizers. When irrigation run-off water is treated, any nitrates and phosphates that have been introduced by fertilizers will be broken down thereby reducing the contaminating effects of run-off on stream, rivers and estuary waters.

Experiments with an Ion Collider used in conjunction with a dialysis machine showed that use of the Ion Collider removed unwanted fats from blood plasma.

Ion Collider treated refrigerants such as Freon 134$a$ exhibit enhanced thermodynamic characteristics including increased vapor pressures, thus making these refrigerants more marketable.

Treatment of pure liquids in an Ion Collider lowers the molecular weight of the liquid without creating new compounds or substances.

While we have illustrated and described preferred embodiments of our invention, such disclosures should not be regarded as any limitation of the scope of our invention. The true scope of our invention is defined in the appended claims.

What is claimed is:

1. A method of changing the physical characteristics of a fluid, comprising:

flowing the fluid under pressure into an elongated cylindrical chamber, flowing the fluid out of the elongated chamber through a plurality of holes in the wall of the chamber in the form of jets of fluid directed against the walls of an axially aligned annular chamber, the walls of said axially aligned annular chamber being made of copper-nickel alloy to induce the alloy to give up electrons, and combining the freed electrons with molecules of the fluid to thereby alter the physical characteristics of the fluid.

2. A method of changing the physical characteristics of a fluid as set forth in claim 1 in which the sum of the cross-sectional areas of the plurality of holes in the wall of the elongated cylindrical chamber is greater than the cross-sectional area of the elongated cylindrical chamber.

3. A method of changing the physical characteristics of a fluid as set forth in claim 1 in which the velocity of the jets of fluid exiting from the plurality of holes in the wall of the elongated cylindrical chamber is at least 0.025 feet (0.0076 m) per minute.

4. A method for treating a fluid to alter its physical characteristics, comprising:

flowing the fluid under pressure into an elongated cylindrical chamber of a treating apparatus, said treating apparatus comprising a first elongated pipe and a second elongated pipe axially aligned with and surrounding said first pipe; said first pipe having a wall having a plurality of spaced-apart holes therethrough, and having an entry end and an exit end, said wall, entry end and exit end defining said elongated cylindrical chamber; said second elongated pipe having an inner surface comprising a copper-nickel alloy, and having an entry end and an exit end;

flowing the fluid out of the elongated chamber through said plurality of holes in the form of jets of fluid directed against said inner surface of the second pipe to induce the copper-nickel alloy to give up electrons; and combining the freed electrons with molecules of the fluid to thereby alter the physical characteristics of the fluid.

5. The method of claim 4, wherein the copper-nickel alloy is flame coated onto said second elongated pipe to form said inner surface.

6. The method of claim 4, wherein the treating apparatus includes a copper wire wound around the outside of the first pipe in the form of a helix.

7. The method of claim 4, wherein said first pipe is made of a copper-nickel alloy, and said second pipe is made of black iron, said copper-nickel surface being applied to said second pipe inner surface by flame coating.

8. A method of changing the physical characteristics of a fluid, comprising:

flowing the fluid under pressure into an elongated cylindrical chamber, flowing the fluid out of the elongated chamber through a plurality of holes in the wall of the chamber in the form of jets of fluid directed against the walls of an axially aligned annular chamber, the walls of said axially aligned annular chamber comprising a copper-nickel alloy having at least about 1% nickel and about 80% copper, to induce the alloy to give up electrons, and combining the freed electrons with molecules of the fluid to thereby alter the physical characteristics of the fluid.

9. The method of claim 8, wherein the sum of the cross-sectional areas of the plurality of holes in the wall of the elongated cylindrical chamber is greater than the cross-sectional area of the elongated cylindrical chamber.

10. The method of claim 8, wherein the velocity of the jets of fluid exiting from the plurality of holes is at least 0.025 feet per minute.

* * * * *